US006854197B2

(12) United States Patent
Knight

(10) Patent No.: US 6,854,197 B2
(45) Date of Patent: Feb. 15, 2005

(54) TAPE MEASURES

(75) Inventor: Jonathan Arnold Manley Knight, London (GB)

(73) Assignee: Fisco Tools Limited, Rayleigh (GB)

( * ) Notice: Subject to any disclaimer, the term of this patent is extended or adjusted under 35 U.S.C. 154(b) by 0 days.

(21) Appl. No.: 10/626,606

(22) Filed: Jul. 25, 2003

(65) Prior Publication Data
US 2004/0163272 A1 Aug. 26, 2004

Related U.S. Application Data

(63) Continuation-in-part of application No. PCT/GB02/03529, filed on Aug. 1, 2002.

(51) Int. Cl.⁷ .................................................. G01B 3/10
(52) U.S. Cl. ........................................................ 33/767
(58) Field of Search .................................... 33/767, 755

(56) References Cited

U.S. PATENT DOCUMENTS

| 3,220,112 | A |   | 11/1965 | Quenot et al. |  |
|---|---|---|---|---|---|
| 3,812,588 | A | * | 5/1974 | Bennett | 33/767 |
| 4,131,244 | A |   | 12/1978 | Quenot |  |
| 4,153,996 | A | * | 5/1979 | Rutty | 33/767 |
| 4,651,429 | A | * | 3/1987 | Ljungberg et al. | 33/767 |
| 4,927,092 | A | * | 5/1990 | Ingram et al. | 33/767 |
| 4,938,430 | A | * | 7/1990 | Chapin | 33/767 |
| 4,976,048 | A | * | 12/1990 | Blackman | 33/767 |
| 6,349,482 | B1 | * | 2/2002 | Gilliam | 33/767 |

FOREIGN PATENT DOCUMENTS

| DE | 1 145 803 | 3/1963 |
| EP | 0 393 892 A2 | 10/1990 |

* cited by examiner

Primary Examiner—Christopher W. Fulton
(74) Attorney, Agent, or Firm—Burns, Doane, Swecker & Mathis, L.L.P.

(57) ABSTRACT

A tape measure is disclosed which has a spooled measuring blade mounted via a rotatable connection within a casing. The blade is extended from the case via an opening for use. The blade can be braked with respect to the opening by operation of braking means. The braking means are operable via a switch which has a length greater than the radius of the fully spooled blade. The switch is located and sized so that the brake can be engaged or disengaged by a user's hand without changing grip. The brake is a cam brake rotatably connected to the switch via a push-pull member.

21 Claims, 3 Drawing Sheets

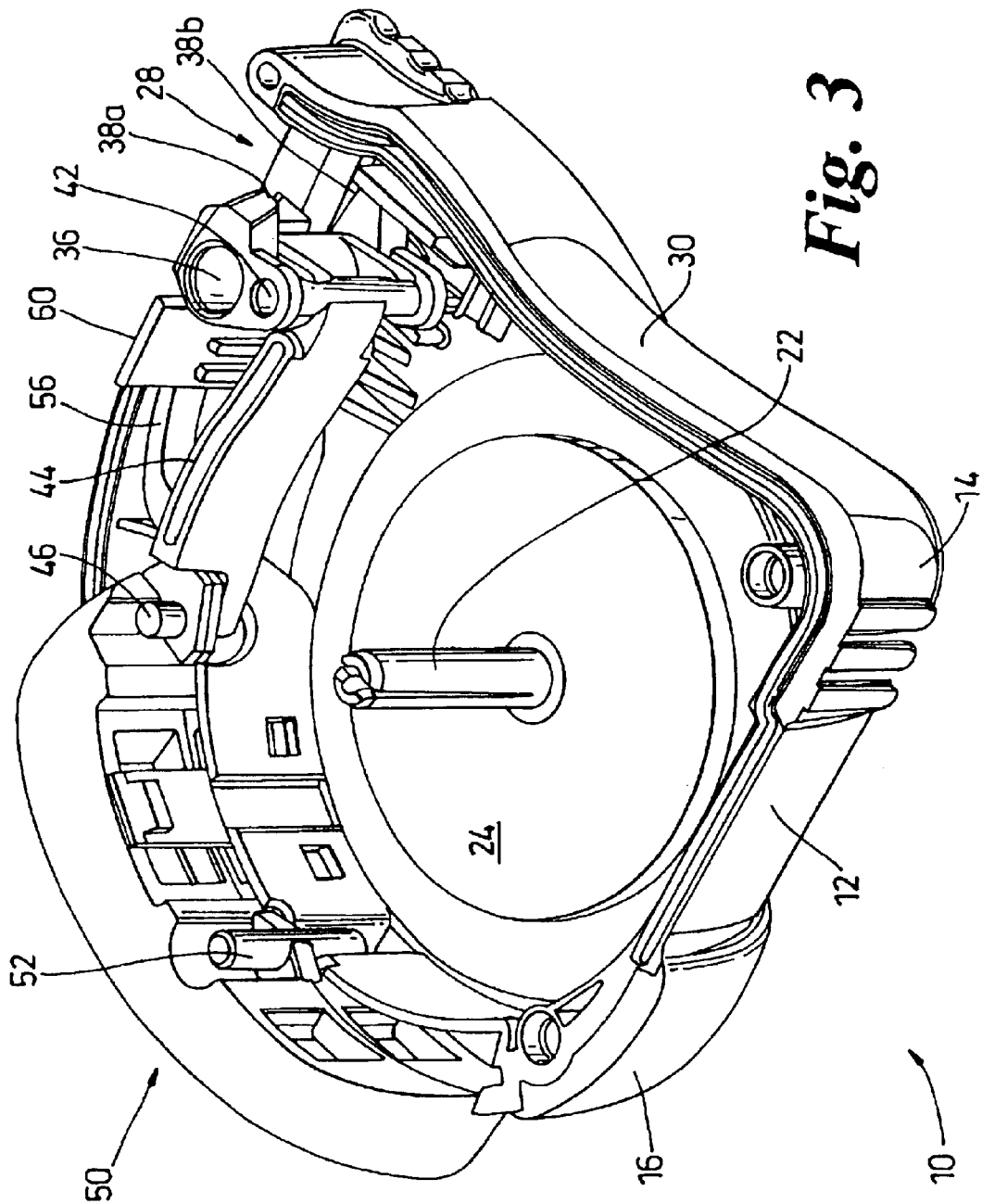

TAPE MEASURES

This application is a continuation-in-part of pending International Patent Application No. PCT/GB02/03529, filed on 1 Aug. 2002, which has not yet been published. Applicant hereby claims priority under 35 USC §120 and §365(c) to the filing date of the above-identified International Application, the entire content of which is incorporated herein by reference.

FIELD OF THE INVENTION

The present invention relates to tape measures, and in particular to tape measures having a spooled measuring blade.

BACKGROUND OF THE INVENTION

In the description of the background of the present invention that follows reference is made to certain structures and methods, however, such references should not necessarily be construed as an admission that these structures and methods qualify as prior art under the applicable statutory provisions. Applicants reserve the right to demonstrate that any of the referenced subject matter does not constitute prior art with regard to the present invention.

Known tape measures include tape measures having a metallic measuring blade which is spooled within a casing. The blade is extendable from the casing by pulling its free end. When released, the blade is automatically retracted back into the casing. Typically, this retraction is due to a spring within the casing, for example, a spring connected between the casing and a reel on which the blade spools.

In order to prevent unwanted retraction of the blade during use, it is necessary to maintain the blade in its extended form. This maintenance of extension can be done manually by the user, for example, but this is inconvenient. Usually, a brake is provided which can be operated to prevent the blade from retracting or from extending further.

The brake can act on the reel to prevent spooling and/or unspooling of the blade. Alternatively, the brake can act directly on the blade to prevent movement with respect to the casing. In either case, the brake must exert a considerable force since the blade is usually immobilised by friction. In the case where the brake acts directly on the blade, the brake can press the blade against a portion of the casing.

Typically, a brake is engageable by operation of a button or the like on or in the casing. Alternatively it may be engageable by operation of a slider. In either case, the user normally must exert considerable force to engage and/or disengage the brake since the brake itself must exert considerable force to brake the blade.

SUMMARY OF THE INVENTION

Accordingly, in a first aspect, the present invention provides a tape measure having a case enclosing a spooled measuring blade, the blade being drawable from the case via an opening, the blade being brakable with respect to the opening via braking means bistably operable between braking and non-braking positions via a switch, wherein the switch is pivotable about an axis in the middle third of its length, said switch length being greater than the radius of the fully spooled (non-extended) measuring blade.

The provision of a pivotable switch of the length mentioned above allows the user to operate the braking means to brake or release the blade with ease. There are also other advantages associated with this feature and with preferred features. Such advantages and preferred features are mentioned below.

The provision of a pivotable switch (as opposed to a slider switch, for example) facilitates the engagement and disengagement of the braking means. Since the switch is pivotable about an axis in the middle third of the switch, one end of the switch may be designated as a braking means engagement end and the other end as a braking means disengagement end.

It is to be noted here that the pivot axis of the switch preferably intersects the body of the switch itself. However, there are certain switch embodiments which do not necessarily require this feature.

In a preferred embodiment, the axis about which the switch is pivotable lies approximately half way along the length of the switch. Thus, the leverage provided to the user by each of the ends of the switch is approximately the same. This is particularly advantageous if the braking mechanism requires approximately equal force magnitudes for engagement and disengagement.

In an alternative preferred embodiment, the axis about which the switch is pivotable lies in a position between approximately one third and one half of the way along the length of the switch. Since the distances between the ends of the switch and the pivot axis are not the same, the leverage provided to the user by each of the ends of the switch is not the same. This is particularly advantageous if the braking mechanism requires unequal force magnitudes for engagement compared to disengagement. Preferably, the pivot axis lies closer to the disengagement end of the switch than to the engagement end, e.g. in the case where the engagement of the braking means requires a higher force than the disengagement of the braking means.

Preferably, the switch length is greater than 1.5 times the radius of the fully spooled measuring blade. More preferably, the switch length is greater than twice the radius of the fully spooled measuring blade. The length of the switch determines its effectiveness, along with the position of the pivot axis, in acting as a lever to engage or disengage the brake. This is explained further below.

The brake usually acts against the force of a spring (which typically acts to urge the blade back into its spooled configuration). Therefore, the effectiveness of the braking means may be judged (at least in part) by how well the brake prevents re-spooling of the blade. In general, the class or size of spring used is dependent on the size of the tape measure, which in turn is dependent on the overall length of the blade. The shape of the blade (including its overall length) determines the radius of the fully spooled blade.

In general, the engagement of an effective braking means (e.g. one which applies a high frictional force to the blade to brake it) requires a considerable force. Also, the longer the blade, the higher (in general) the re-spooling urging force will be from the spring. Hence, the longer the blade, the more firmly must the brake act. Thus, the length of the blade (and hence the radius of the fully spooled blade) has an impact on the required length of the switch to engage the brake.

The radius of the fully spooled blade also has an impact on the dimensions of the case. Therefore preferable ranges for the switch length can be defined in terms of the dimensions of the case. Typically, the switch length is greater than half or three-quarters of the length of the case (measured in a direction parallel to the direction in which the blade is drawable from the case). Alternatively, the switch length may be more than half or three-quarters of the length of the "footprint" of the tape measure. More preferably, the switch length is greater than half or three quarters of the maximum linear dimension of the case.

In known tape measures, if the brake acts directly on the blade, it is usually situated at or close to an opening in the casing through which the blade is extendable. Furthermore, the button/slider for operation of the brake is usually located close to the brake to allow a simple mechanical linkage between the two. This location is inconvenient for the user since, during use of the tape measure, no part of a user's hand is normally located close to the opening. The button and slider may be combined as a single part. Therefore, for engagement/disengagement of the brake, a user must normally change grip or move his hand in order to operate the button or slider to engage and/or disengage the brake. This can lead to unwanted movement of the blade or casing, and can cause unnecessary strain on the user's hand.

This problem has been addressed in part in EP-A-393892 which discloses a tape measure with a locking mechanism which is activated by a button located directly above an opening through which the tape is extendable. The blade is extendable from the casing in a forward direction. The opening is at a lower corner of the casing. The button is located on a top surface of the casing in a forward position. In EP-A-393892, the locking mechanism is activated and deactivated by a user's finger or thumb. However, since considerable force is required to operate the button, particularly to deactivate the locking mechanism, it may nevertheless be necessary for a user to change grip to operate the button.

Accordingly, in a second, independent, aspect of the invention there is provided a tape measure having a case enclosing a spooled measuring blade, the blade being drawable from the case via an opening, the blade being brakable with respect to the opening via braking means bistably operable between braking and non-braking positions via a pivot switch, wherein the switch is located and sized so that, in use by a user, it is operable to engage or disengage the brake by use of a thumb or finger of the user's hand and subsequently it is operable to disengage or engage the brake by use of the heel or palm of the user's hand without changing grip.

In preferred embodiments, the invention provides an ergonomic shape to the switch and case which allows engagement and disengagement of the braking means without a change of grip required on the part of the user's hand.

Preferably, the switch is located at the top, e.g. at the top surface, of the case. In normal use, it is this part of the tape measure which is held by the user's hand, and so this location of the switch is typically most convenient.

The second aspect of the invention may incorporate any of the features mentioned with respect to the first aspect, including preferred features, and vice versa.

As mentioned above, the braking means is a particularly important part of the tape measure, since the braking means determines the force with which the extended measuring blade is held in the extended position. This in turn affects the usefulness of the tape measure since a firm brake can assist the user in, e.g., ensuring consistent measurement readings during a series of measurements. This may be the case, for example, where the blade is extended to a particular length during a measurement and this length of blade is used to carry out a different, subsequent measurement. Any movement of the blade into or, more likely, out of the case may affect the subsequent measurement. Such movement may, for example, be caused by the user hooking the free end of the blade over the object to be measured. This can cause the blade to drag from the case.

Known tape measures use a brake which comprises a wedge-type brake foot which is driven onto the blade to trap the blade between the brake foot and an inner surface of the case (a brake pad). Such driven brake foot wedges are typically operated using sliding switches.

On simple one-piece brakes the slider and button are combined in one moulding, the slider having a brake foot at the opposite end to the button. The slider rotates in a track and the brake foot acts a wedge trapping the blade between the brake foot and the brake pad on the case. In two-part brakes, the brake button is separate and acts on a brake spring/foot/wedge/member that applies the force to the blade. This can be achieved by rotational or a rocking pivot action.

However, wedge braking mechanisms tend not to be able to apply enough force to the blade to give a strong frictional grip on the blade. Using only a mild force, it is usually possible to drag the blade from the case further, even when such a brake is applied.

Other tape measures use a cam braking system. In a cam braking system, a cam (in this case, a frictional engagement member which is mounted so that it can rotate about a fixed post into a locking position, or equivalent means) is rotated onto the blade in order to press it against an opposing surface, e.g. an inner surface of the case (brake pad). In general, cam brakes are more efficient than directly-driven wedge brakes since a firmer frictional grip on the blade can be obtained using the cam.

However, the cam requires rotating into position, and this in general requires a large force.

A known tape measure of the cam braking type is manufactured by Fisco and called the Uni-Matic tape measure (product code UM). This tape measure has a cam brake which is operated using a rotatable lever which is directly connected to the cam. The lever is located on the side of the case of the tape measure. This is necessitated by the nature of the force which must be applied to rotate the cam into and out of position. However, the lever can be awkward to operate due to its location.

Accordingly, in a third aspect, the present invention provides a tape measure having: a case enclosing a spooled measuring blade which is drawable from an opening in the case; and braking means for braking the blade with respect to the opening, the braking means being bistably operable between braking and non-braking positions, the braking means including a cam brake which is pivotable about a cam pivot axis which is fixed with respect to the case, wherein the cam brake has a rotatable joint with a first end of a push-pull member for rotation of the cam between braking and non-braking positions.

Use of a rotatably-jointed push-pull member to engage and disengage the cam allows the brake to be applied more conveniently. This is in contrast to the prior art lever which is rotatable with respect to the case but attached fixedly to the cam. This advantage is explained in more detail below. The push-pull member may, for example, be a rod.

Preferably, the movement describable by the cam, in use, is purely concentric, about the cam pivot axis, with respect to the case.

The braking means may be operable into the braking position by pressing a pivotable switch to one side of its pivot and into the non-braking position by pressing the pivotable switch to the other side of its pivot.

Preferably, the second end of the push-pull member is moveable by operation of a pivotable switch. The second end of the push-pull member may, for example, be connected (typically rotatably, e.g. by a hinge) to one end of the pivotable switch. In this way, the cam brake can be engaged by the user pressing one end of the pivotable switch, rather than requiring the user to rotate directly a lever through the same angle as the cam. Typically, in engagement of the cam brake, the push-pull member performs a pushing operation.

Furthermore, it may be possible to disengage the cam brake using the same switch and the same push-pull member. Typically, when performing this function, the push-pull member performs a pulling operation. This can be actuated by a user pressing the opposite end of the pivotable switch compared to the end with which the push-pull member is connected.

Use of the push-pull member allows for flexibility in the design of the brake actuating mechanism. This means that the pivotable switch can be located in a convenient position, and can be of an ergonomic size, shape and position. In particular, the user-operated means to engage/disengage the brake (in this case, the switch) need not be fixedly connected to the cam.

Preferably, the pivotable switch is the same switch as mentioned with respect to the first aspect. More preferably, the present invention provides a tape measure including all of the features of the third aspect and one, more or all of the features and/or the preferred features of the first and/or second aspect.

Preferably, in this third aspect, the tape measure includes spring means to urge the cam towards the braking position and/or towards the non-braking position. Such spring means may be provided to assist the user in applying or disengaging the brake. Preferably, the spring means (e.g. one or more, preferably one) are arranged to bias the cam towards the braking position or the non-braking position, depending on the instantaneous position of the cam.

The braking mechanism may be bistable. That is, the braking mechanism may be stable in two positions. Typically, the braking mechanism will be stable in a cam disengagement position and in a cam engagement position. It is usually possible to define an intermediate position between these positions, as described below. Typically, the intermediate position is closer to the cam engagement position than to the cam disengagement position.

If the braking mechanism (e.g. the cam) is in a position between the non-braking position and the intermediate position, then the spring means typically urges the braking mechanism towards the non-braking position. If the braking mechanism (e.g. the cam) is in a position between the intermediate position and the braking position, then the spring means typically urges the braking mechanism towards the braking position.

Preferably, the spring means is connected to the push-pull member. For example, the spring means may be a leaf spring, a first end of which is fixed to the push-pull member. In that case, the second end (free end) of the leaf spring may be slidably engageable with a retaining surface. Movement of the push-pull member would then require movement of the second end of the leaf spring against the retaining surface.

The retaining surface and the spring are typically arranged so that the intermediate point between the braking and non-braking positions of the braking mechanism corresponds to the maximum force applied to the push-pull member by the spring. In other words, at the intermediate point, the spring applies its maximum urging to the push-pull member. In the case of a leaf spring, this in turn corresponds to the maximum bend (or displacement) between the spring and the push-pull member which is possible in the range of movement of the braking mechanism. Thus, the push-pull member can be urged away from the intermediate point towards either the braking or non-braking position.

Preferably, the cam is formed of nylon. Typically, the cam is rotatably mounted about a rotation axis with respect to the casing. There is a rotatable joint connecting it to the first end of the push-pull member. Typically, this joint is made via a hinge in a lever which is formed, e.g., integrally with the cam.

Usually, the push-pull member must be made of a different material to the cam, since otherwise undesirable friction and noise might result. Preferably, the push-pull member is formed of acetal (POM) or another material which has resilient properties in the sense that it has low creep, i.e. it has the ability to return to its original shape after sustained deflection. Preferably, the spring means and the push-pull member are formed in one piece from the same material.

BRIEF DESCRIPTION OF THE DRAWINGS

Preferred embodiments of the present invention are described below, by way of example, with reference to the accompanying drawings, in which:

FIG. 3 is a schematic perspective view of the embodiment illustrated in FIG. 2.

DETAILED DESCRIPTION OF PREFERRED EMBODIMENTS

Figure 1:
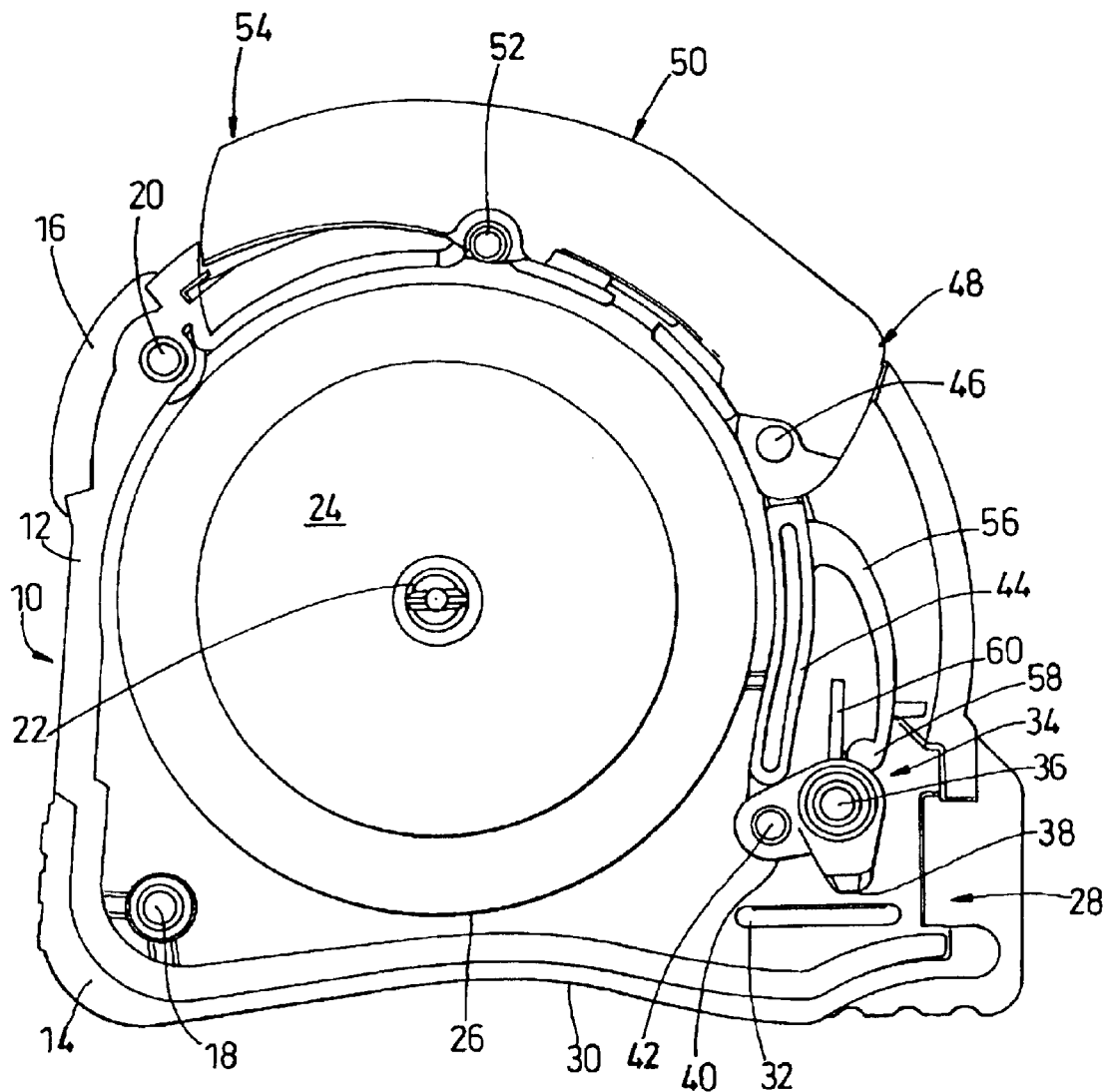
FIG. 1 is a schematic partial sectional view of one half of a tape measure according to an embodiment of the invention.
Figure 2:
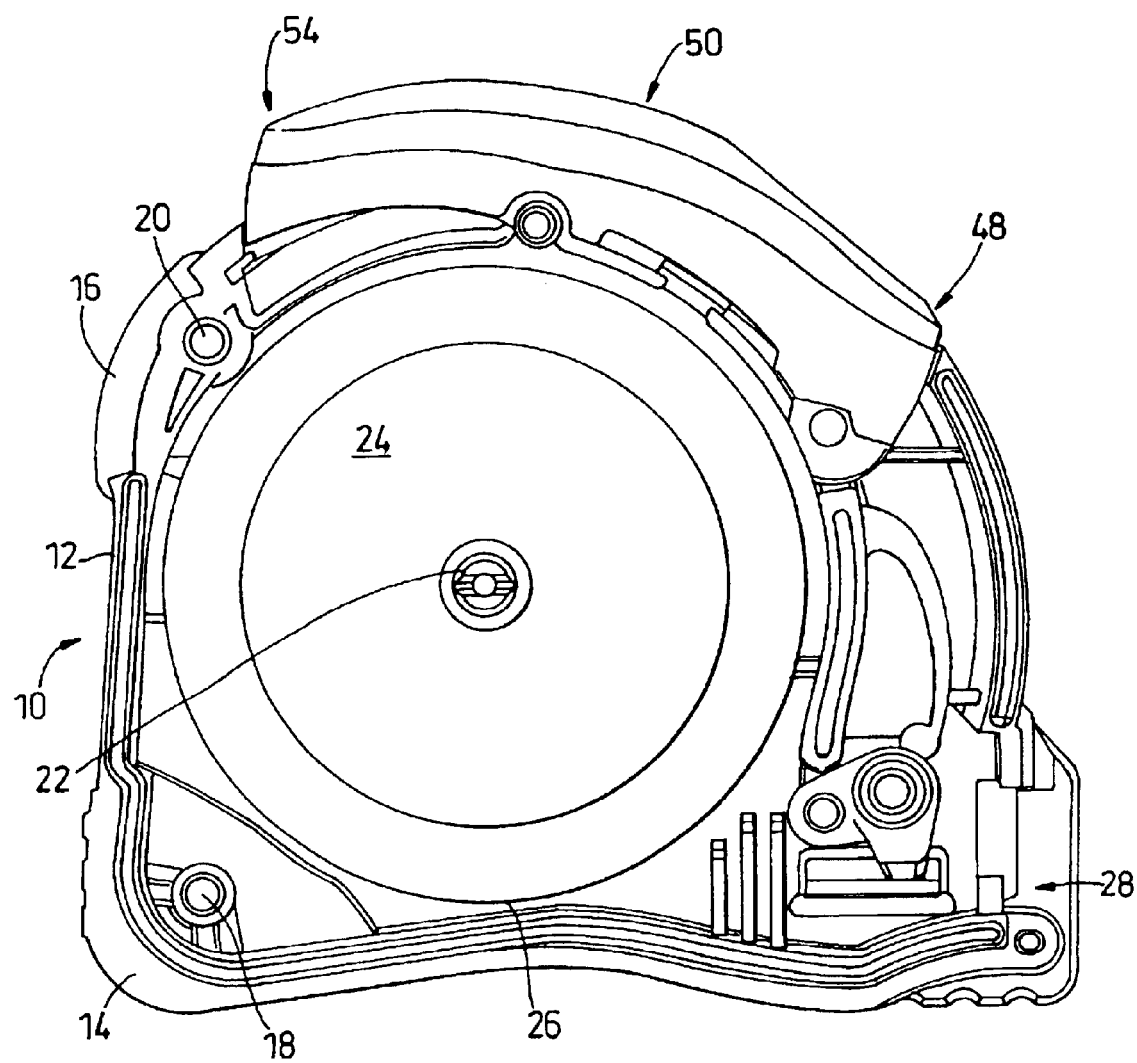
FIG. 2 is a more detailed schematic partial sectional view of the embodiment illustrated in FIG. 1.

Reference is made in particular to FIG. 1, but also to FIGS. 2 and 3. Features which are shown in more than one drawing have been given the same reference numeral. All of the drawings show one half of a tape measure 10. The tape measure has a case 12 which is made from injection moulded plastics material, such as high impact ABS. The measure may also include outer features moulded into the case 12, such as shock-absorbent moulded pads 14,16, e.g. of rubber material (thermoelastic polymer). As shown in FIG. 1, the case 12 may be manufactured in two parts (only one part being shown in FIG. 1), the tape measure being constructed by subsequently fitting the two parts together via connection points 18,20,22,36.

The tape measure 10 includes a central mounting post 22. This post projects from a central region of the inner surface of the side wall 24 of the case. During assembly of the tape measure, the spooled measuring blade (not shown) is rotatably mounted on post 22. Circle 26 provides an indication of the diameter of the fully spooled blade and an indication of the location of the spooled blade within the case.

In use, the blade is drawable from the tape measure via opening 28 in the case 12. Thus, the blade can be extended from the case in a direction roughly parallel to the lower surface 30 of the tape measure. The blade passes over blade engagement wall (brake pad) 32 on its way out of the case.

Shown schematically in FIG. 1 is cam 34. Cam 34 is rotatably mounted on the casing at point 36, which is situated close to opening 28. Typically, cam 34 fits over a post projecting from the case at point 36 and is rotatable around and with respect to that post. Cam 34 also includes a frictional engagement surface 38 which rotates with the cam about point 36. The blade (not shown) can be gripped between the frictional engagement surface 38 and the blade engagement wall (brake pad) 32 when the cam is in the braking position (as shown in FIG. 1). When the cam is in the non-braking position, the frictional engagement surface 38 is rotated up to about 90° clockwise about point 36 compared with the position shown in FIG. 1.

As is shown more clearly in FIG. 3, cam 34 has two frictional engagement surfaces, 38a and 38b. These are arranged so that each side of the measuring blade is gripped by the cam when the brake is engaged.

Cam 34 also includes a lever arm 40 which projects from rotation centre 36. Lever arm 40 has a hole 42 (or a hole formed by opposing half-holes) for a hinge connection to a rigid push-pull member 44. Thus, approximate linear movement up or down in FIG. 1 of the push-pull member moves the lever arm 40 of the cam 34. In turn, the cam rotates as the lever arm 40 is moved. Therefore, upwards movement of the push-pull member 44 in FIG. 1 leads to clockwise rotation of the cam. This moves the braking mechanism away from the braking position towards the non-braking position (not shown).

Push-pull member 44 is attached at its other end, via a hinge 46, to a first end 48 of switch 50. Switch 50 is pivotable with respect to case 12 around pivot attachment 52, shown more clearly in FIG. 3. Clearly, the effect of a user pressing the second end 54 of the switch 50 downwards will be the upwards movement of the first end 48 of the switch, due to the pivoting nature of the switch. In turn, this upwards movement pulls up the push-pull member which rotates the cam in a clockwise direction, leading to the braking mechanism moving to the non-braking position.

As is clear from the drawings, push-pull member 44 is not necessarily exactly straight. In particular, it can have a curvature in order to avoid interference with the spooled blade within the case, yet giving a compact tape measure design. However, it needs to be rigid enough not to deflect too much during use. The push-pull member 44 is cored out from both sides to remove some of the plastic material, to give it the form of an I-beam. This allows it to cool down quickly in the mould to reduce the production cycle time. If left solid, the plastic might be left semi-molten after ejection from the mould and the final dimensions therefore would be unpredictable.

The switch 50 extends substantially full length along the upper face of the tape measure. The switch in particular gives the tape measure an ergonomic advantage because a user can apply the braking mechanism by pressing down the first end 48 of the switch using, e.g., his thumb or forefinger in normal use. Subsequently, the braking mechanism can be disengaged by pressing down the second end 54 of the switch. The second end 54 may be pressed using, e.g. the heel or palm of the user's hand. This is made possible by the length of the switch, and consequently the distance between the ends and the pivoting point 52. Thus, the usable area of the switch at each end to engage or disengage the brake is high. For this reason, a relatively imprecise movement by the user (e.g. pressing with the heel of the hand) is sufficiently precise to operate the switch. Therefore the switch can be operated by a user one-handed, without a change of grip being necessary.

Furthermore, the arrangement of the switch at the top surface is more convenient for the user operating the tape measure. In particular, an advantage here over tape measures having the switch close to the opening in the case (here called opening 28) is that rapid re-spooling of the blade should not pose a safety threat to the hand operating the tape measure according to the preferred embodiment of the present invention.

The switch is made from a rigid core material of ABS with a rubber or thermoplastic elastomer overmoulded covering to provide comfort and high impact resistance. The push-pull member and the spring (described below) are made from POM acetal. The cam is made from nylon. There are other suitable combinations of engineering and general purpose polymers. It is preferred to use dissimilar and/or low friction materials at hinge positions. Polymers with high resilience and low creep are chosen for spring applications.

Formed integrally with the push-pull member 44 is a spring 56, connected to the push-pull member near the second end of the push-pull member, i.e. closer to the switch 50 than to the cam 34. The purpose of the spring is to assist the movement of the cam into the braking and non-braking positions. Thus, the spring biases the braking mechanism towards one of the extreme limits of travel possible for the braking mechanism with respect to the case 12.

The free end 58 of the spring 56 is constrained to travel in a straight line by a surface of straight retaining wall 60. Therefore, when push-pull member 44 moves up or down, free end 58 of spring 56 slides against retaining wall 60.

As will be clear from the drawings, the hinge 42 connecting the first end of push-pull member 44 to the lever arm 40 must rotate with the lever arm when the push-pull member is moved up or down. Therefore the first end of the push-pull member must describe a similar path. This means that the first end of the push-pull member moves towards or away from the retaining wall 60 when the switch 50 is operated. Thus, the distance between the free end 58 of the spring 56 and the first end of the push-pull member varies with movement of the push-pull member. Of course, there will be an equilibrium distance between these parts of the mechanism at which the spring will exert zero urging force on the push-pull member. However, at all other distances, the spring exerts a non-zero force on the push-pull member, urging it in one direction or another.

In this embodiment, it is possible to define an intermediate point in the position of the braking mechanism at which the urging force exerted by the spring is a maximum. This is where the distance between the free end of the spring and the first end of the push-pull member is a maximum. This occurs when the line between points 42 and 36 makes a right angle with a line lying on the surface of the retaining wall 60. At positions beyond this intermediate point (e.g., the braking position, as shown in the drawings), the push-pull member (and therefore the cam) is urged further on into the braking position. At positions before this intermediate position (not shown), the push-pull member is urged back towards the non-braking position.

The free end of the spring is typically rounded to facilitate an ejector in the mould tool. Ribs may be included on the retaining wall 60 to improve the feel and positive action of the brake.

In the way described, the provision of the spring assists the user in engaging and disengaging the brake. This improves the feel of the tape measure in giving a "click-on, click-off" feel to the braking mechanism. It can also help to avoid accidental engaging or disengaging of the brake since the spring provides a minimum resistance force which must be overcome to engage or disengage the brake.

The present invention has been described with reference to the preferred embodiments by way of example only. Modifications of these embodiments, further embodiments and modifications thereof will be clear to the skilled person in the light of the above disclosure, and as such they fall within the scope of the present invention.

We claim:

1. A tape measure comprising:

a case;

a spooled measuring blade enclosed by the case;

an opening defined in the case, the blade being drawable from said case via said opening;

a switch; and braking means bistably operable between braking and non-braking positions via said switch, wherein the blade is brakeable with respect to the opening via operation of the braking means and the switch is pivotable about an axis in the middle third of its length, the switch length being greater than two times a radius of the measuring blade when fully spooled.

2. The tape measure according to claim 1, wherein the axis about which the switch is pivotable lies approximately half way along the length of the switch.

3. The tape measure according to claim 1, wherein the axis about which the switch is pivotable lies in a position between approximately one third and one half of the way along the length of the switch.

4. The tape measure according to claim 1, wherein the switch length is greater than half or three-quarters of the length of the case.

5. The tape measure according to claim 1, wherein the switch length is more than half or three-quarters of the length of the footprint of the tape measure.

6. The tape measure according to claim 1, wherein the switch is located and sized so that it is operable to engage or disengage the brake by use of a thumb or finger of a user's hand and subsequently it is operable to disengage or engage the brake by use of a heel or palm of the user's hand without changing grip.

7. A tape measure comprising:

a case;

a spooled measuring blade enclosed by the case;

an opening defined in the case, the blade being drawable from said case via said opening;

a pivot switch having a length greater than two times a radius of the measuring blade when fully spooled; and braking means bistably operable between braking and non-braking positions via said switch, wherein the blade is brakable with respect to the opening via operation of the braking means and the pivot switch is located and sized so that it is operable to engage or disengage the braking means by use of a thumb or finger of a user's hand and subsequently it is operable to disengage or engage the braking means by use of a heel or palm of the user's hand without changing grip.

8. The tape measure according to claim 7, wherein the switch has an ergonomic shape which allows engagement and disengagement of the braking means without a change of grip required on the part of the user's hand.

9. A tape measure according to claim 7, wherein the switch is located at a top surface of the case.

10. The tape measure according to claim 7, wherein the braking means including a cam brake which is pivotable about a cam pivot axis which is fixed with respect to the case, wherein the cam brake has a rotatable joint with a first end of a push-pull member for rotation of the cam brake between braking and non-braking positions.

11. A tape measure comprising:

a case;

a spooled measuring blade enclosed by the case;

an opening defined in the case, the blade being drawable from said case via the opening; and braking means bistably operable between braking and non-braking positions, wherein the blade is brakeable with respect to the opening via operation of the braking means, and the braking means comprises:

a cam brake having a cam pivot axis which is fixed with respect to the case;

a push-pull member having first and second ends; and a rotatable joint between the cam brake and said first end of said push-pull member, wherein the cam brake is rotatable between braking and non-braking positions.

12. The tape measure according to claim 11, wherein the movement describable by the cam, in use, is purely concentric, about the cam pivot axis, with respect to the case.

13. The tape measure according to claim 11, further comprising a pivotable switch wherein the braking means is operable into the braking position by pressing the pivotable switch to one side of its pivot and into the non-braking position by pressing the pivotable switch to the other side of its pivot.

14. The tape measure according to claim 11, further comprising: a pivotable switch wherein said second end of the push-pull member is moveable by operation of said pivotable switch.

15. The tape measure according to claim 14, wherein the second end of the push-pull member is rotatably connected to one end of the pivotable switch.

16. The tape measure according to claim 11, further comprising spring means to urge the cam towards the braking position and/or towards the non-braking position.

17. The tape measure according to claim 16, wherein the spring means is arranged to bias the cam towards the braking position or the non-braking position, depending on the instantaneous position of the cam.

18. The tape measure according to claim 16, wherein the spring means is connected to the push-pull member.

19. The tape measure according to claim 18, wherein the spring means is a leaf spring, a first end of which is fixed to the push-pull member.

20. A tape measure according to claim 19, wherein, a second end of the leaf spring is slidably engageable with a retaining surface to vary the displacement between the second end of the spring and the push-pull member.

21. The tape measure according to claim 16, wherein the spring means and the push-pull member are formed in one piece from the same material.

* * * * *